United States Patent [19]
Ishikawa et al.

[11] Patent Number: 5,575,549
[45] Date of Patent: Nov. 19, 1996

[54] SURFACE LIGHT SOURCE DEVICE

[75] Inventors: Tsuyoshi Ishikawa, Tokyo; Kayoko Watai, Hasuda; Kazuaki Yokoyama, Ageo, all of Japan

[73] Assignee: Enplas Corporation, Saitama-ken, Japan

[21] Appl. No.: 290,087

[22] Filed: Aug. 12, 1994

[51] Int. Cl.$^6$ .................................................. F21V 7/04
[52] U.S. Cl. .............................. 362/31; 362/330; 362/339
[58] Field of Search .................................. 362/31, 26, 27, 362/327, 328, 330, 339

[56] References Cited

U.S. PATENT DOCUMENTS

| | | | |
|---|---|---|---|
| 5,420,761 | 5/1995 | DuNah et al. | 362/31 |
| 5,461,547 | 10/1995 | Ciupke et al. | 362/31 |
| 5,485,291 | 1/1996 | Qiao et al. | 362/31 X |
| 5,485,354 | 1/1996 | Ciupke et al. | 362/31 |

FOREIGN PATENT DOCUMENTS

| | | |
|---|---|---|
| 3-31782 | 3/1991 | Japan . |
| 3-189679 | 8/1991 | Japan . |
| 94802 | 12/1993 | Japan . |

OTHER PUBLICATIONS

Translation of above Japanese Patent Claims in 94802–1993 and 3-31782, statement of relevance in 3-189679.

*Primary Examiner*—Stephen F. Husar
*Attorney, Agent, or Firm*—Finnegan, Henderson, Farabow, Garrett & Dunner, L.L.P.

[57] ABSTRACT

A surface light source device using a light conducting member, in which a multiplicity of concave portions are formed on an opposite surface of a light emitting surface of the light conducting member and the concave portions are arranged to have specific shapes to obtain a bright surface light source with a uniform brightness. A light diffusing material is fulfilled within the concave portions of the light conducting member so that a more uniform brightness can be obtained in an easy manner.

3 Claims, 13 Drawing Sheets

SURFACE LIGHT SOURCE DEVICE

BACKGROUND OF THE INVENTION a) Field of the Invention

The present invention relates to a surface light source device using a light conducting member.

b) Description of the Prior Art

FIG. 1 shows a construction of a conventional surface light source device using a light conducting member. This device comprises a light conducting member 11, a linear light source 12 arranged in the vicinity of one of edge surface 11a (light incident surface) of the light conducting member, a diffusion plate 13 located on or adjacent to a light emitting surface 11b of the light conducting member 11 and a reflective surface 14 disposed on or adjacent to an opposite side surface 11c of the light emitting surface of the light conducting member 11. In this surface light source device, a light emitted from the light source 12 is made incident upon the light incident surface 11a of the light conducting member 11, and then transmitted inside of the light conducting member toward an opposite edge surface of the light incident surface 11a. The light directed into the light conducting member 11 in this manner is emitted from the light emitting surface 11b while being transmitted inside of the light conducting member 11. Then the light emitted from the light emitting surface 11b passes through the diffusing plate 13 to form a diffused light, which is available for use as a surface light source.

In such a surface light source device, a pattern of fine diffusing portion 20 is formed on the opposite side surface 11c of the light emitting surface 11b of the light conducting member 11 in order to increase a light emitting efficient of the light which is made incident into the light conducting member 11, and to get a uniform brightness distribution on the diffusing plate 13, which allows to have a uniform and bright surface light source. The pattern is formed by printing or something like that with the aid of painting material having a light diffusing function.

Since such a surface light source device is used, for example, as a backlight for a liquid crystal display unit, it is required to produce a brighter light. However, the above-explained conventional surface light source device cannot provide an enough brightness for such an application. Therefore, various means are suggested on such type of the surface light source devices to increase the brightness of the emitting light.

As typical surface light source devices to which means for increasing the brightness is applied, there are disclosed in Japanese Patent Kokai Publication No. 3-189679 and Japanese utility Kokai Publication No. 3-31782. In the conventional surface light source devices disclosed in these publications, a large number of pyramid-shaped convex or concave portions are formed on the opposite side surface of the light emitting surface of the light conducting member in order to increase the brightness. Further, these convex or concave portions are arranged to be varied according to the area chosen to produce a uniform brightness distribution.

The conventional devices, however, have a problem in that the amount of the emitting light of the device is larger in the area closer to the light source 12 and decreases as farther from the light source 12, so that a uni-form surface light source device cannot be obtained. Particularly, in case that the light source 12 is provided only one of the edge surfaces of the light conducting member and the distance between the edge surface of the light source side and the opposite side edge surface is long, the difference of the amount of the emitting light between the area closer to the light source and the area far from the light source becomes extremely large.

In order to solve this problem, there is suggested another surface light source device in which a light reflecting member is provided on the edge surface opposite to the light incident edge surface of the light conducting member. However, in this device, the amount of the emitting light is decreased even in the area which is only a little far from the light reflective member. Thus no good effect can be obtained by the light reflective member and it is difficult to get a uniform brightness distribution even from the newly suggested light source device.

Further, in the above-explained conventional devices, the light reflected on the surfaces of the convex or concave portions formed on the opposite side surface of the light conducting member is directly emitted from the light emitting surface. Therefore, the amount of the emitting light emitted from the portions of the light emitting surface corresponding to the convex or concave portions on the opposite side surface becomes large, so that there is a difference in brightness between the portions corresponding to the convex or concave portions and the other portions, which causes an unevenness of brightness.

In order to solve this problem, it is suggested to arrange as a coarse surface on an inclined surface of the conical or polygonal pyramid-shaped concave portions. In such devices, the light arrived at the inclined surfaces of the concave portions is diffused by the coarse surface and therefore, it is possible to prevent that the brightness becomes partially large due to that the emitting light emitted from the portions corresponding to the concave portions is larger in comparison with the light emitted from the other portions.

However, such devices are not in practice use, be cause it is difficult to make coarse surfaces on the inclined surfaces of the fine concave portions, each of whose diameter is extremely small, i.e. about 0.1–1.0 mm. Particularly, it is much more difficult to control the coarse ratio of the inclined surfaces of the small concave portions to be uniform and obtain the firstly demanded coarse ratio. Therefore, even if the coarse surfaces can be arranged inclined surface of the concave portions, the coarse ratio would not become uniform and as demanded, and thus it would be difficult to obtain a uniform emitting light from the light conducting member.

SUMMARY OF THE INVENTION

An object of the present invention is to provide a surface light source device comprising a light conducting member made of transparent material, a linear light source which is located in the vicinity of at least one edge surface of the light conducting member, a diffusion plate located on a light emitting surface of the light conducting member, and a reflective member disposed on the opposite side surface of the light emitting surface of the light conducting member, the opposite side surface of the light conducting member has a multiplicity of fine conical or polygonal pyramid-shaped concave portions formed thereon and top angles and inclined angles with respect to the opposite side surface of the concave portions are set within a given range to obtain a bright surface light source device with a uniform brightness distribution.

Another object of the present invention is to provide a surface light source device comprising a light conducting member made of transparent material, a linear light surface which is located in the vicinity of at least one edge surface of the light conducting member, a diffusion plate located on a light emitting surface of the light conducting member, and a reflective member disposed on the other surface opposite to the light emitting surface of the light conducting member, a multiplicity of concave portions are provided on the opposite side surface of the light conducting member and the concave portions are fulfilled with a light diffusion material or a light scattering material.

A still another object of the present invention is to provide a surface light source device in which a multiplicity of concave or convex portions are formed on the opposite side surface of the light conducting member, and the opposite side surface as a whole, on which the concave or convex portions are formed, is covered with a light diffusion material or a light scattering material.

DETAILED DESCRIPTION OF THE PREFERRED EMBODIMENTS

Figure 1:
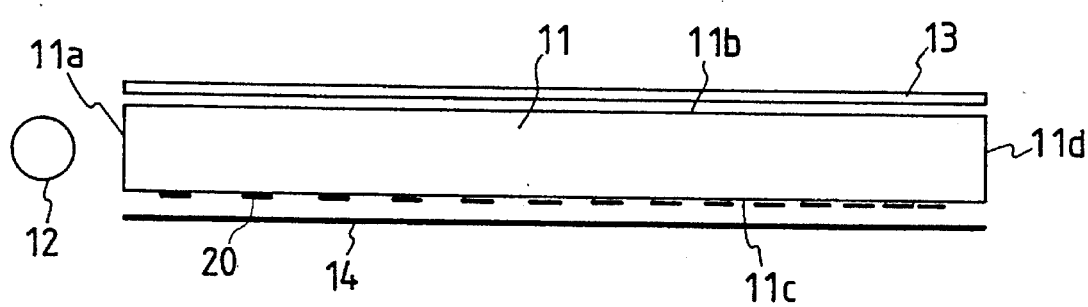
FIG. 1 is a schematic view showing a conventional surface light source device using a light conducting member.
Figure 2:
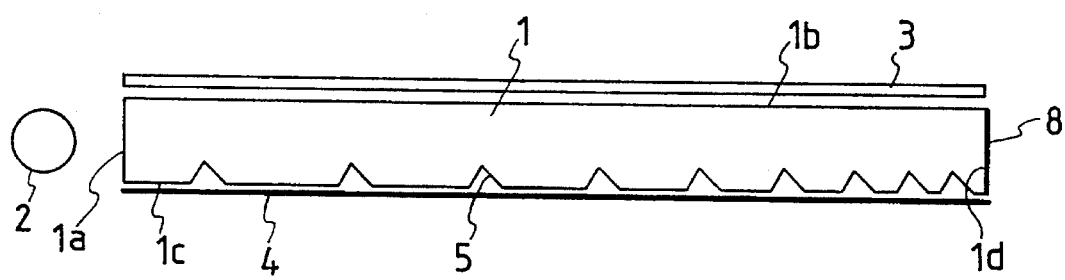
FIG. 2 is a schematic view depicting a first embodiment of a surface light source device according to the present invention.
Figure 3:
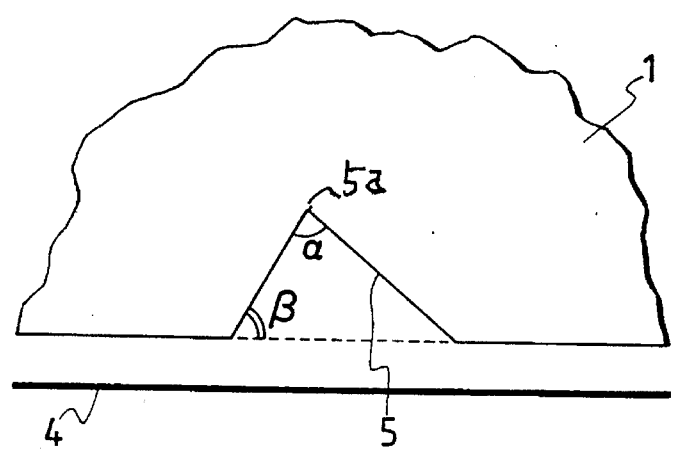
FIG. 3 is a schematic view illustrating a shape of the concave portion formed on the light conducting member of the first embodiment in an enlarged scale.

FIG. 2 shows a sectional view of a first embodiment of a surface light source device according to the present invention. In FIG. 2, the numerical reference 1 represents a light conducting member, 2 a linear light source, 3 a diffusion plate, 4 a reflective plate and 8 represents another reflective member. In this embodiment, there are provided a multiplicity of conical or polygonal pyramid-shaped concave portions 5 on an opposite side surfaces 1c of a light emitting surface 1b of the light conducting member 1. One of the conical or polygonal pyramid-shaped concave portions 5 is illustrated in FIG. 3 in an enlarged scale. The conical or polygonal pyramid-shaped concave portion 5 has its cross-section cut by a plane which extends in perpendicular to a longitudinal direction of the linear light source 2 and passes through the top portion 5a of the concave portion 5, as shown in FIG. 3, and the top angle α and the inclined angle β on the light source side of the concave portion are arranged to satisfy the following conditions.

$80° \leq \alpha \leq 100°$ $90 > \beta > 90° - \theta$ wherein the reference symbol θ represents a value given by the formula shown in below when the light refracting index of the light conducting member is n.

$\theta = \sin^{-1}(1/n).$

In the surface light source device according to the first embodiment, the light emitted from the light source 2 is made incident upon a light incident edge surface 1a of the light conducting member 1 to be directed inside thereof and then transmitted. A part of the transmitted light is made incident upon the inclined surfaces of the conical or polygonal pyramid-shaped concave portions 5 on the light source side and then passes through the inclined surfaces to be directed to the light reflecting surface of the reflective member 4. A most of the light directed to the reflecting member 4 is then reflected there to be returned into the light conducting member 1 via the opposite side surface 1c thereof.

When the light passes through the inclined surface of the concave portion 5 or the opposite side surface 1c of the light conducting member 1, the light is refracted there by and diffused by the coarse surface of the reflective sheet 4. As a result, the light reflected by the reflective sheet is directed in all directions.

Figure 4:
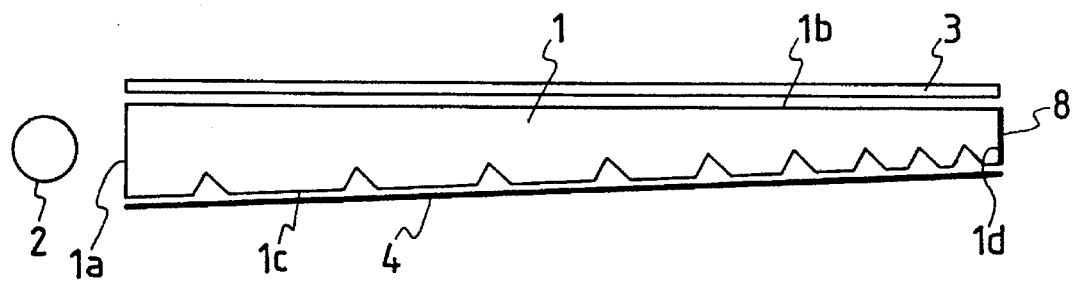
FIG. 4 is a schematic view representing a second embodiment of a surface light source device according to the present invention.
Figure 5:
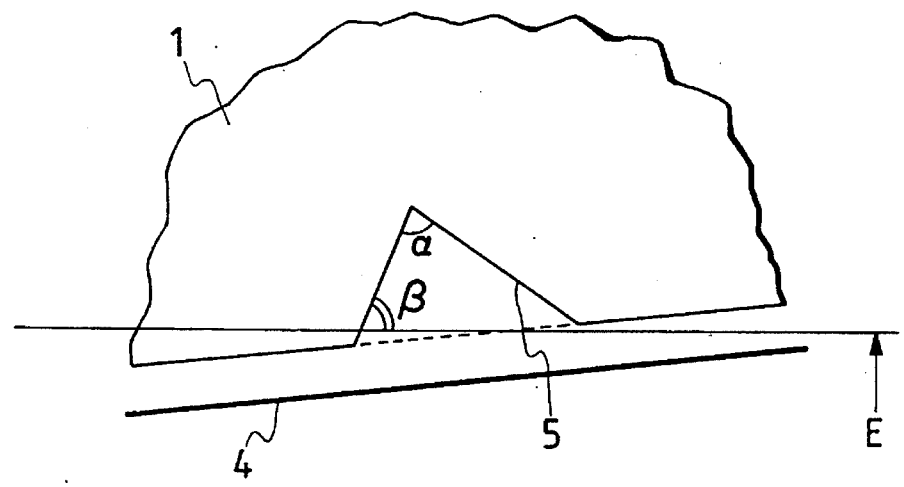
FIG. 5 is a schematic view showing a shape of the concave portion formed on the light conducting member of the opposite side embodiment in an enlarged scale.

FIGS. 4 and 5 show the second embodiment of the surface light source device according to the present invention. In the second embodiment, the device is so designed that the thickness of the light conducting member 1 is larger on the light incident edge surface and smaller on the other edge surface side, and the opposite side surface 1c of the light conducting member 1 is inclined with respect to the light emitting surface 1b. Further, as shown in FIG. 5, the shape of the conical or polygonal pyramid-shaped concave portion 5 is arranged such that the inclined angle β of the inclined surface thereof with respect to the plane which is parallel to the light emitting surface 1b of the light conducting member 1 satisfies the conditions in below. That is to say, the angles alpha and beta of the concave portion 5 shown in FIG. 5 satisfies the following conditions.

$80° \leq \alpha \leq 100°$ $90° > \beta > (90° - \theta)$

By such arrangement of the shape of the concave portion 5, the same effect as that of the first embodiment also can be obtained in the second embodiment of the surface light source device having its construction shown in FIG. 4.

Figure 6:
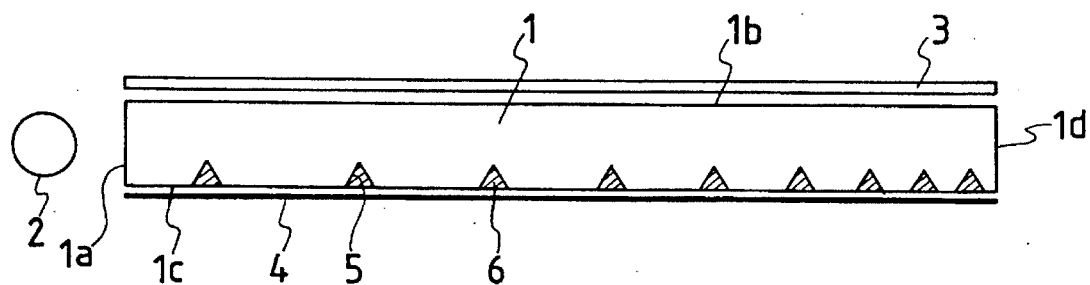
FIGS. 6 and 7 are schematic views depicting third and fourth embodiments of surface light source devices according to the present invention.

FIG. 6 shows the third embodiment of a surface light source device according to the present invention. In this embodiment, on the opposite side surface 1c of the light conducting member 1 are provided the same conical or polygonal pyramid-shaped concave portions having the same shapes and the same dimensions; and the pitches therebetween are arranged to be larger in the light source side (the light incident edge surface side) and smaller as farther from the light source in order to obtain a comparatively uniform brightness distribution. Furthermore, these concave portions are filled with light diffusing material or light scattering material. Therefore, when the light transmitted inside of the light conducting member 1 is reflected by the concave portions 5 or reflected by the reflective member 4 after passing through the concave portions 5, the light is diffused or dispersed in all directions, and thus a surface source having an extremely uniform brightness distribution can be obtained.

The surface light source device according to the third embodiment can be easily manufactured by fulfilling the light diffusing material or light scattering material within the concave portions 5.

It is desired to use a foamed resin such as polyethyleneterephthalate, paints containing a powder of light reflective material such as silica, titanium oxide, and barium sulfate, or synthetic resin for molding containing such reflective material.

The light diffusing material or light scattering material can be fulfilled within the concave portions 5 of the light conducting member 1 as in the following manner. That is to say, the light diffusing material or light scattering material is firstly applied on the opposite side surface 1c of the light emitting surface 1b of the light conducting member 1 to fulfill the light diffusing material or light scattering material within the concave portions 5; and then, wipe the material out from the opposite side surface 1c of the light conducting member 1. The alternative method is to mold a synthetic resin containing a light reflective material by two color injection molding method, when the light conducting material 1 is molded.

Figure 7:
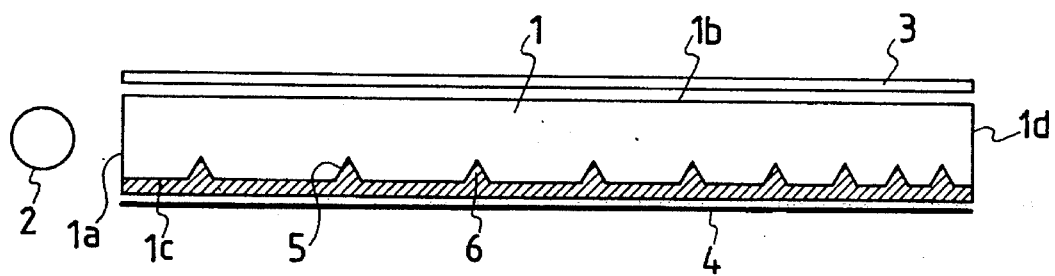

FIG. 7 shows the fourth embodiment of a surface light source device according to the present invention. In the fourth embodiment, the opposite side surface 1c of the light conducing member 1, on which a multiplicity of conical or polygonal pyramid-shaped concave portions 5 are provided, is covered with the light diffusing material or the light scattering material.

In the fourth embodiment, since the opposite side surface 1c of the light conducting member 1 as a whole is coated with the light diffusing material or the light scattering material, the light directed to the opposite side surface 1c out of the light being made incident into the light conducting member 1 is reflected in all directions by the light diffusing material or the light scattering material. Therefore, in this embodiment, it is not necessary to provide a light reflective member or a light reflective sheet on the opposite side surface 1c side of the light conducting member 1. Further, since there is no space between the light conducting member 1 and the light diffusing material or the light scattering material, it is easier to design and manufacture the device in comparison with the third embodiment shown in FIG. 6, in which an air space exists between the surface 1c of the light conducting member 1 and the reflective member 4.

As shown in FIGS. 6 and 7, the surface light source devices according to the third and fourth embodiments are so designed that the conical or polygonal pyramid-shaped concave portions 5 having the same shape and the same dimension are formed on the opposite side surface 1c of the light conducting member 1 but the pitch of the concave portions 5 are varied as shown in these figures. It may be possible to form concave portions having the other shapes on the opposite side surface 1c of the light conducting member 1. In the surface light source devices disclosed in Japanese Utility Model Kokai Publication No. Hei5-94802 and in U.S. patent application (U.S. Ser. No. 07/982942), both of which are filed by the present applicant, a light conducting member has fine concave or convex portions with various shapes on a surface opposite to a light emitting surface; and the inclined surfaces of the concave or convex portions are arranged to be coarse.

In the following embodiments, the present invention is applied on the light conducting member, which is disclosed in Japanese Utility Model Kokai No. Hei 5-94802 or in U.S. Ser. No. 07/982942, in which concave or convex portions 5 having various shapes are formed on the opposite side surface 1c of the light conducting member 1 but a light diffusing material or light scattering material is fulfilled in the concave portions or a light diffusing material or a light scattering material is coated on the surface of the light conducting member 1 as a whole instead of making coarse surface on the inclined surfaces of the concave or convex portions.

Figure 8:
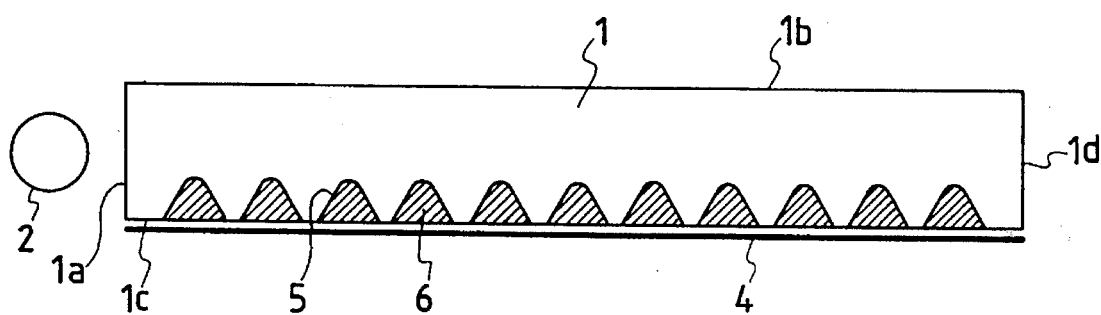
FIGS. 8 to 32 are schematic views illustrating the other embodiments in which the present invention is applied to light conducting members having various shaped concave or convex portions.

In the embodiment shown in FIG. 8, a multiplicity of concave portions 5, whose shapes are not conical or polygonal pyramid, are formed on the opposite side surface 1c of the light emitting surface 1b of the light conducting member 1. These concave portions 5 have the same shapes and the same dimensions and are arranged at the same pitch. And the light diffusing material or the light scattering material 6 is fulfilled within these concave portions 5.

Figure 9:
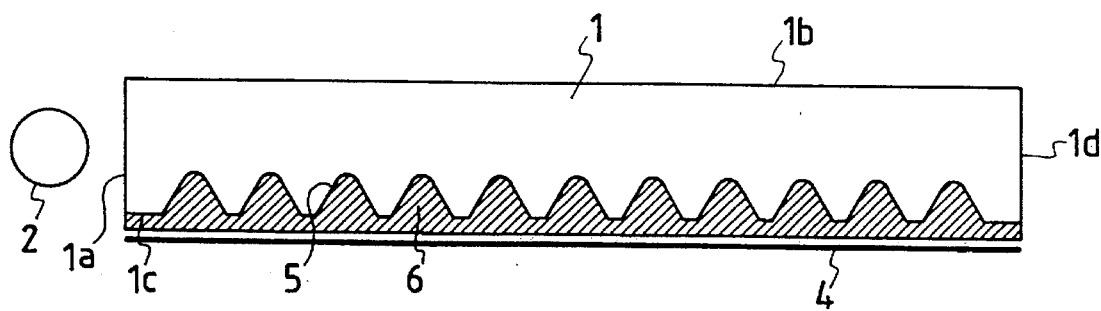

In the embodiment shown in FIG. 9, the concave portions 5 have the same shapes and are arranged in the same manner as those of the embodiment shown in FIG. 8, but the light diffusing material or the light scattering material 6 is coated on the opposite side surface 1c of the light conducting member 1 so as to cover the surface 1c as a whole.

Figure 10:
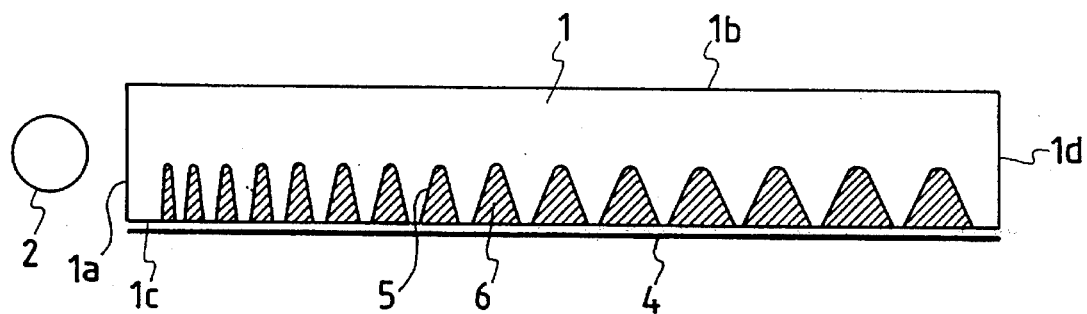

In the embodiment shown in FIG. 10, the concave portions 5 formed on the opposite side surface 1c of the light conducting member 1 are arranged such that the heights (depths) of the concave portions 5 are constant and the areas of the openings of the concave portions 5 are smaller on the light source 2 side and become larger as farther from the light source 2. And, the light diffusing material or the light scattering material 6 is fulfilled within the concave portions 5.

Figure 11:
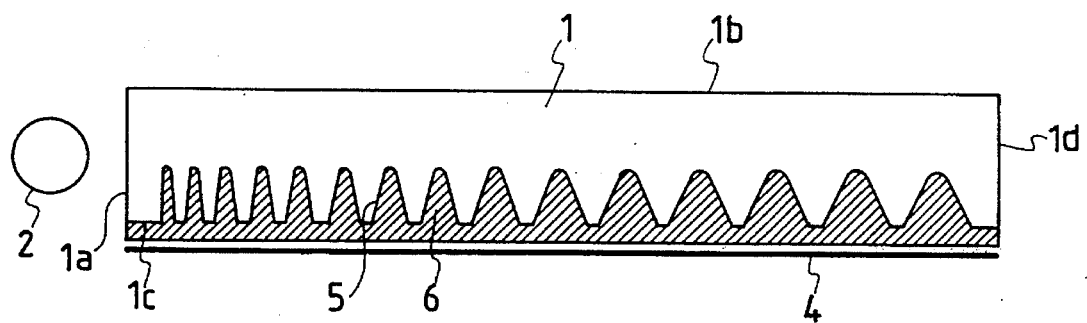

In the embodiment shown in FIG. 11, the concave portions 5 formed on the opposite side surface 1c of the light conducting member 1 have the same shapes and are distributed in the same manner as those of the embodiment shown in FIG. 10, but the surface 1c as a whole is coated by the light diffusing material or the light scattering material 6.

Figure 12:
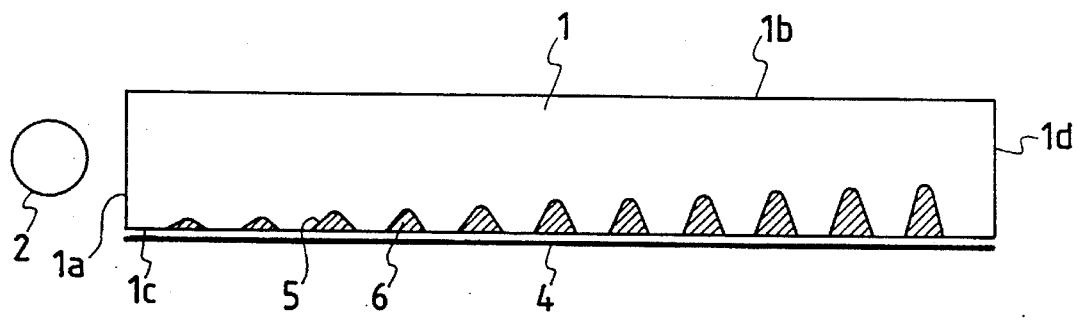

In the embodiment shown in FIG. 12, the concave portions 5 are formed on the opposite side surface 1c of the light conducting member 1 such that the areas of the openings of the concave portions 5 are the same but the heights (depths) are arranged to be smaller in the light source 2 side and become larger as farther from the light source 2; and the light diffusing material or the light scattering material 6 is fulfilled within the concave portions 5.

Figure 13:
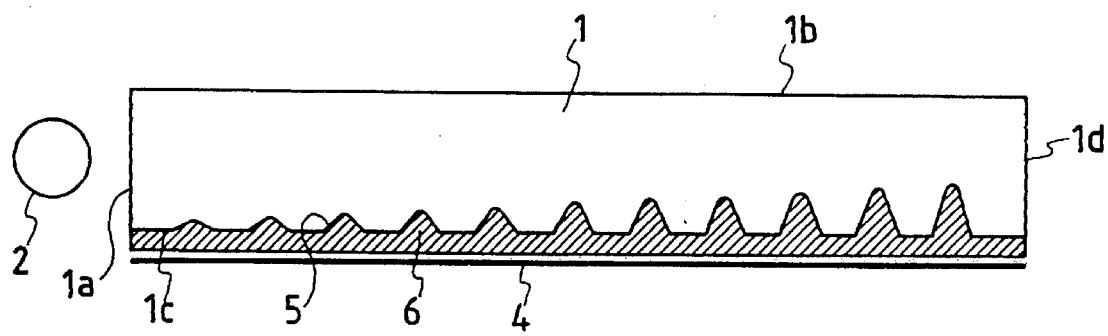

In the embodiment shown in FIG. 13, the concave portions 5 are arranged on the opposite side surface 1c of the light conducting member 1 in the same manner as that of the embodiment shown in FIG. 12. But, the opposite side surface 1c as a whole is coated by the light diffusing material or the light scattering material 6.

Figure 14:
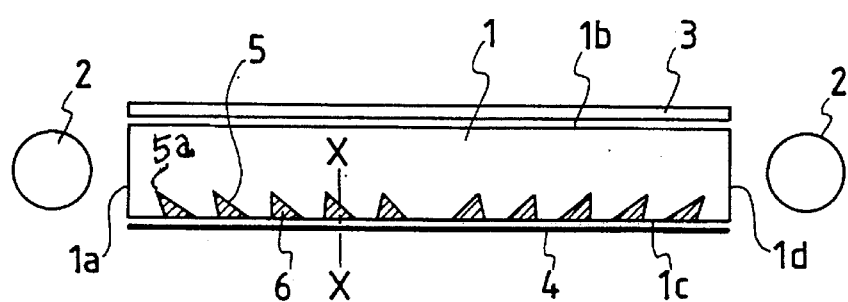

In the embodiment shown in FIG. 14, each of the concave portion 5 formed on the opposite side surface 1c of the light conducting member 1 has a asymmetric shape. That is to say, each of the concave portion 5 is formed in an asymmetrical manner with respect to a direction X—X in FIG. 14. Further, the top portion 5a of each concave portion 5 is directed toward the linear light sources 2 and 2. As same as the above embodiments, the light diffusing material or the light scattering material 6 is fulfilled within the concave portions 5.

In the surface light source device shown in FIG. 14, linear light sources 2 are disposed on both edge surfaces (on the left side edge surface 1a and the right side edge surface 1d in FIG. 14), which are opposite to each other. Therefore, the tops 5a of the left side half of the concave portions 5 are directed to the left side and the right side half to the right side according to the center of the both edge surfaces 1a and 1d.

In case only one linear light source 2 is arranged on one of the edge surfaces, each of the asymmetrical concave portions 5 should be arranged that the direction of the top 5a of the concave portion 5 is directed toward the same direction, i.e. the light source side direction.

Figure 15:
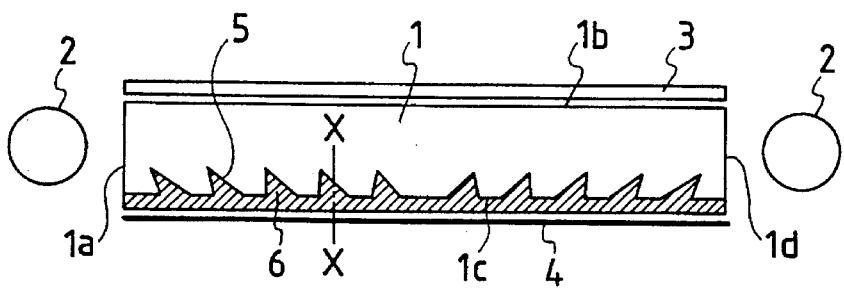

In the embodiment shown in FIG. 15, the concave portions 5 formed on the opposite side surface 1c of the light conducting member 1 have the same shapes as those of the embodiment shown in FIG. 14 and are arranged in the same manner, but the opposite side surface 1c as a whole is coated by the light diffusing material or the light scattering material 6.

Figure 16:
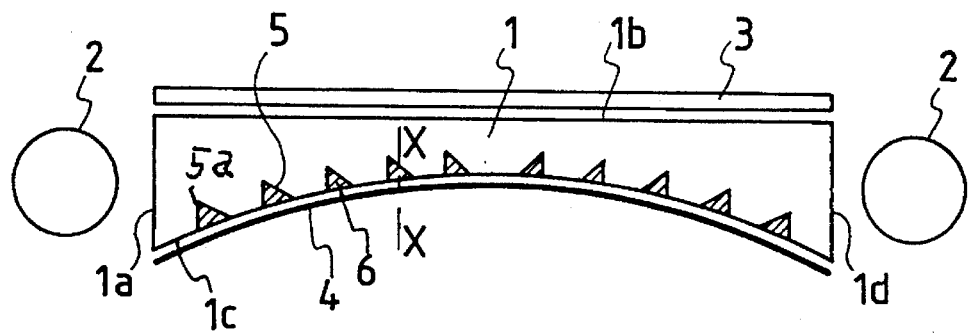

In the embodiment shown in FIG. 16, the opposite side surface 1c of the light conducting member 1 is arranged to be concave and a multiplicity of fine concave portions 5 with asymmetrical shapes are formed on the concaved surface 1c. In this embodiment, two linear light sources 2, 2 are arranged in the vicinity of the both edge surface 1a and 1d. Thus the tops 5a of the concave portions 5 are directed toward the light sources 2 and 2 as well as the embodiments shown in FIGS. 14 and 15. And, the light diffusing material or the light scattering material 6 is fulfilled within the concave portions 5.

Figure 17:
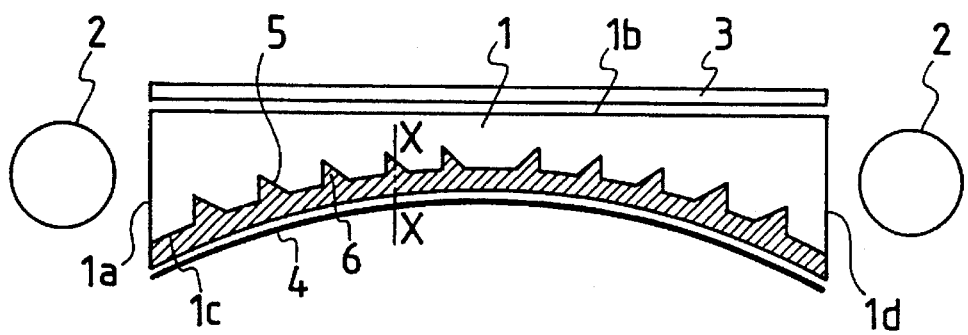

In the embodiment shown in FIG. 17, the concave portions 5 are arranged in the same manner as those of the embodiment shown in FIG. 16, but the opposite side surface 1c of the light conducting member 1 as a whole is coated by the light diffusing material or the light scattering material 6.

Figure 18:
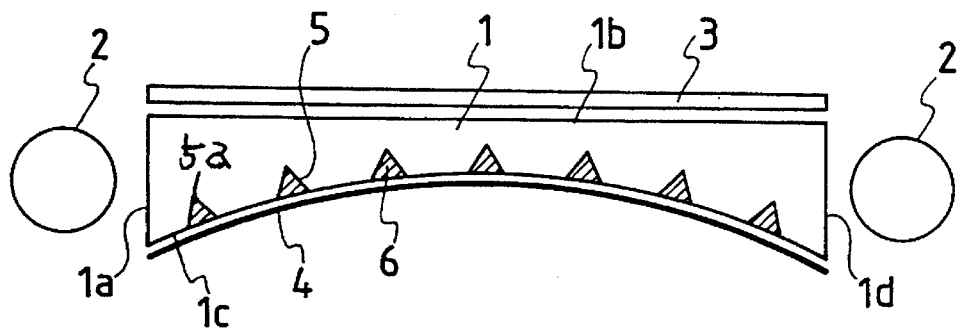

In the embodiment shown in FIG. 18, the opposite side surface 1c of the light conducting member 1 is arranged as a concave surface and two linear light sources 2 and 2 are disposed on the both edge surface sides 1a and 1d of the light conducting member 1. In this embodiment, the concave portions 5 formed on the opposite side surface 1c have symmetrical conical or polygonal pyramid shapes in the same manner. Therefore, the openings of the concave portions 5 are also arranged to be concave and thus the tops 5a are actually directed toward to the light source sides. The light diffusing material or the light scattering material 6 is fulfilled within the concave portions 5.

Figure 19:
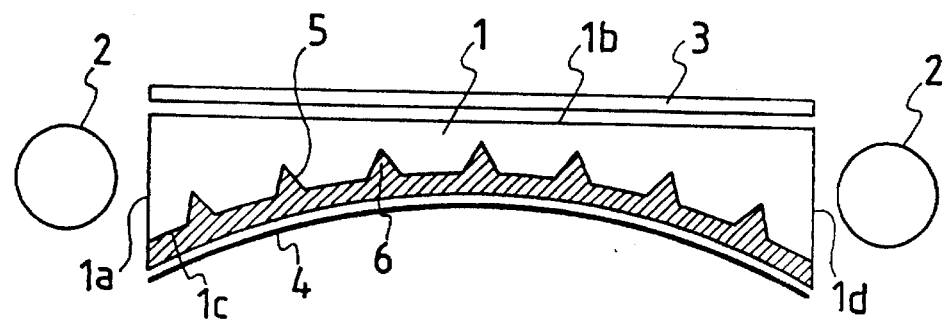

In the embodiment shown in FIG. 19, the opposite side surface 1c and the concave portions 5 are arranged in the same manner as those of the embodiment shown in FIG. 18, but the opposite side surface 1c of the light conducting member 1 as a whole is covered with the light diffusing material or the light scattering material 6.

In the following embodiments shown in FIGS. 20 to 27, the present invention is applied to the surface light source devices disclosed in U.S. Ser. No. 07/982942.

Figure 20:
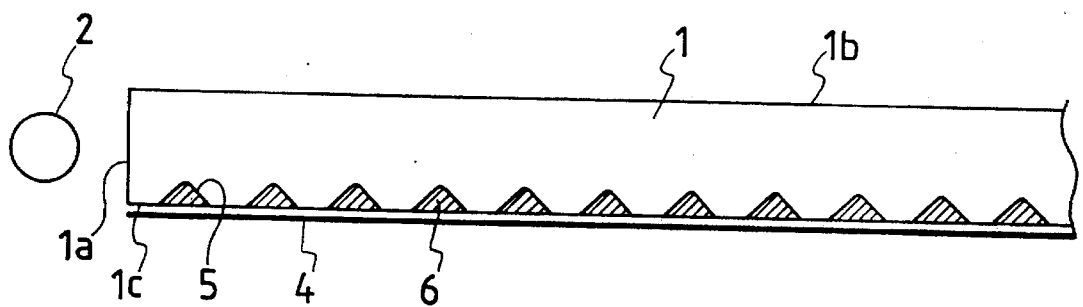

In the embodiment shown in FIG. 20, a multiplicity of conical or polygonal pyramid-shaped concave portions 5 are formed on the opposite side surface 1c of the light conducting member 1. These concave portions 5 have the same shape and the same dimension and are arranged with a constant pitch. The light diffusing material or the light scattering 6 is fulfilled within the concave portions 5.

Figure 21:
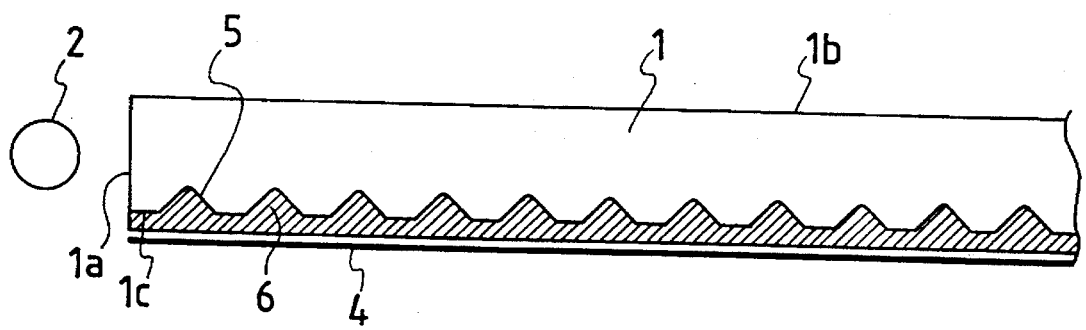

In the embodiment shown in FIG. 21, the concave portions 5 are formed on the opposite side surface 1c of the light conducting member 1 in the same manner as that of the embodiment shown in FIG. 20, however, the opposite side surface 1c as a whole is coated by the light diffusing material or the light scattering material.

Figure 22:
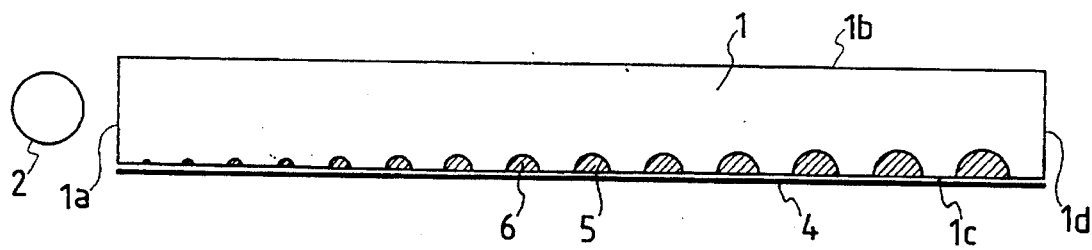

In an embodiment shown in FIG. 22, the shapes of the concave portions 5 are semi-spherical; and the radius of curvatures of the concave portions 5 are smaller on the linear light source 2 side and become larger as farther from the light source 2. The light diffusing material or the light scattering material is fulfilled within the concave portions 5.

Figure 23:
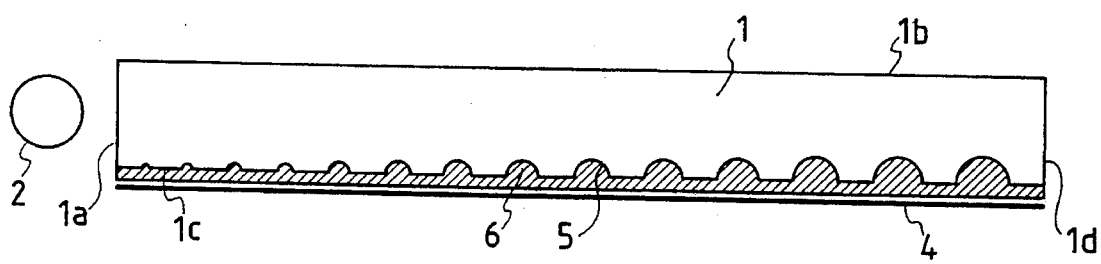

In an embodiment shown in FIG. 23, the concave portions 5 have the same shapes as those of the embodiment shown in FIG. 22 and are arranged in the same manner, but the light diffusing material or the light scattering material 6 is coated on the opposite side surface 1c as a whole of the light conducting member 1.

Figure 24:
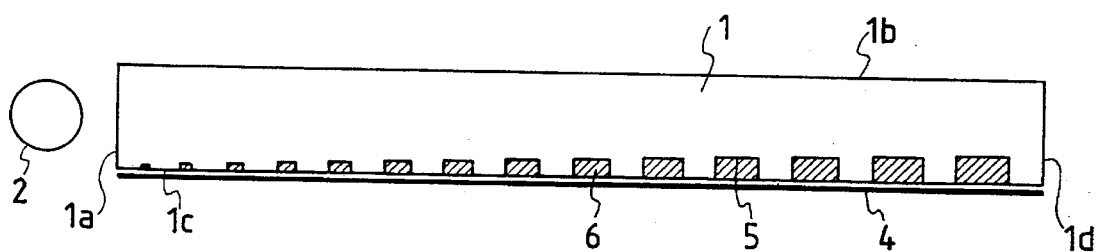

In an embodiment shown in FIG. 24, a cylindrical-shaped concave portions 5 are formed on the opposite side surface 1c of the light conducting member 1 in such a manner that the diameter and the heights (depths) of the concave portions 5 are arranged to be smaller on the linear light source 2 side and become larger as farther from the light source 2. The light diffusing material or the light scattering material 6 is fulfilled within the concave portions 5.

Figure 25:
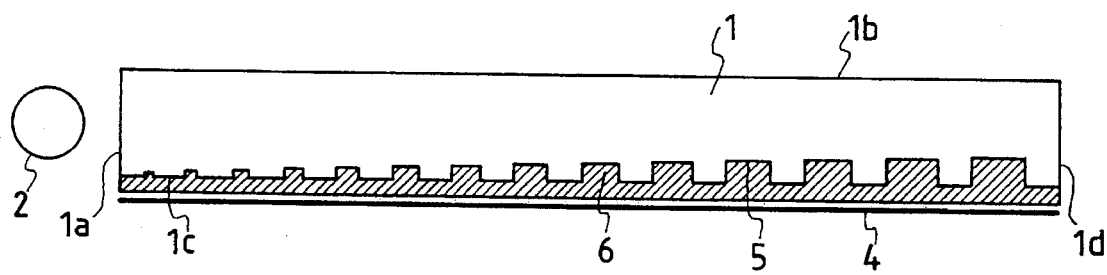

In an embodiment shown in FIG. 25, the concave portions 5 are formed on the opposite side surface 1c of the light conducting member 1 in the same manner as that of the embodiment shown in FIG. 24, but the light diffusing material or the light scattering material 6 coats over the oppeite side surface 1c as a whole.

Figure 26:
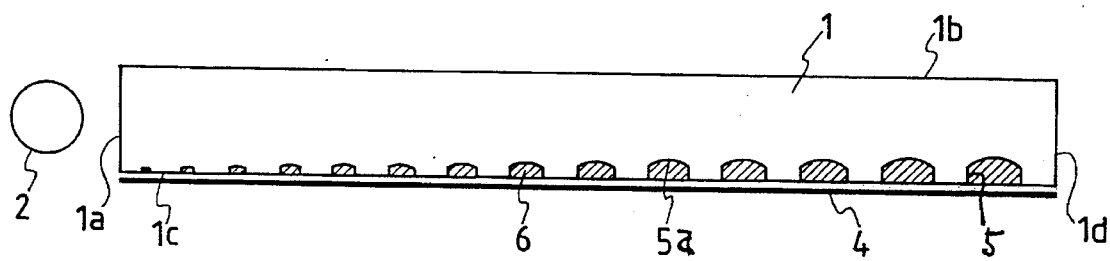
Figure 27:
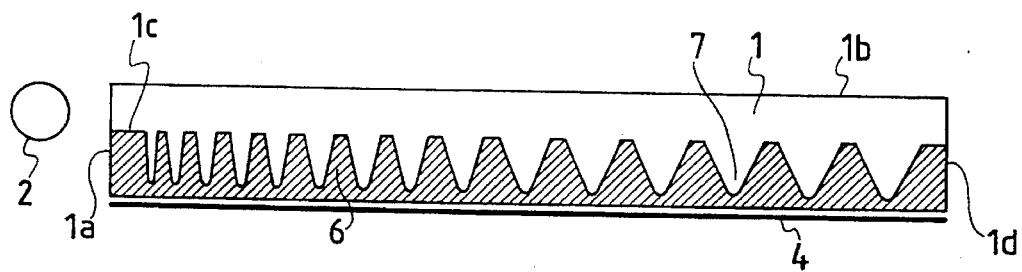

In embodiments shown in FIGS. 26 and 27, the shapes of the concave portions 5 are almost the same as those of the embodiments shown in FIGS. 24 and 25, but the top surfaces 5a of the concave portions 5 are arranged to be curved. The other constructions of these embodiments are the same as those of the previous two embodiments, respectively.

In the following embodiments shown in FIGS. 28 to 32, the present invention is applied to some of surface light source devices disclosed in Japanese Utility Model Kokai Publication No. Hei 5-94802 and U.S. Ser. No. 982942, in which a multiplicity of depressions are formed on the opposite side surface 1c of the light conducting member 1. In these embodiments, the projections (convex portions) are formed on the surface opposite to the light emitting surface of the light conducting member 1, and the light diffusing material or the light scattering material 6 should be applied on the opposite side surface 1c as a whole so as to completely cover all over the depressions.

Figure 28:
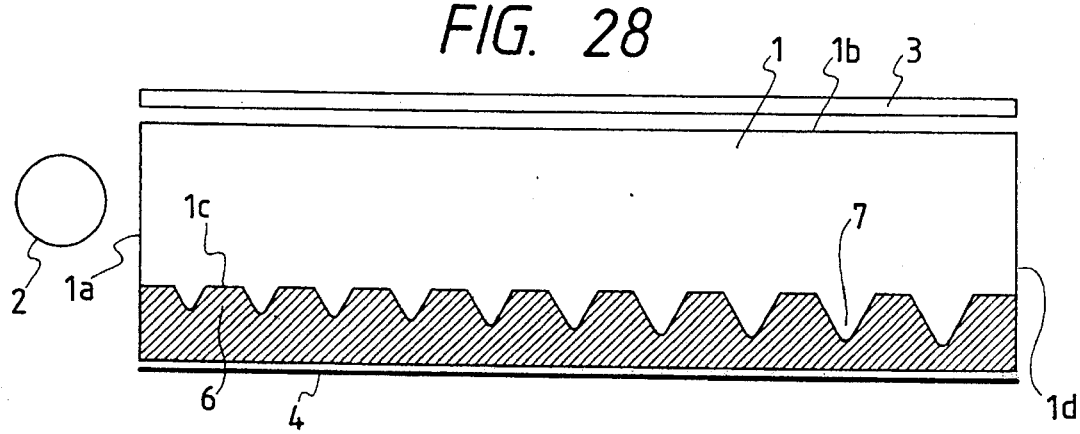

In the embodiment shown in FIG. 28, the convex portions 7 are formed on the opposite side surface 1c of the light conducting member such that the heights of the convex portions are shorter on the most light source 2 side and becomes higher as farther from the light source 2.

Figure 29:
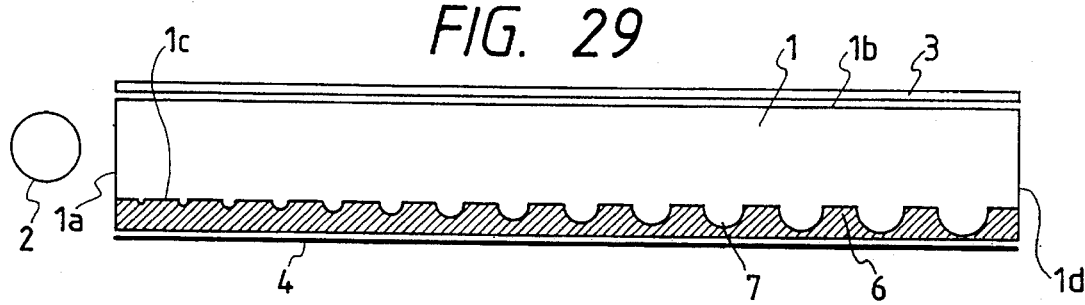

In the embodiments shown in FIGS. 29 to 32, the present invention is applied to the surface light source device disclosed in U.S. Ser. No. 07/982942. In FIG. 29, the semi-spherical-shaped convex portions are formed on the opposite side surface 1c of the light conducting member 1; and the radius of curvatures of the convex portions 7 are smaller on the light source 2 side and become larger as farther from the light source 2.

Figure 30:
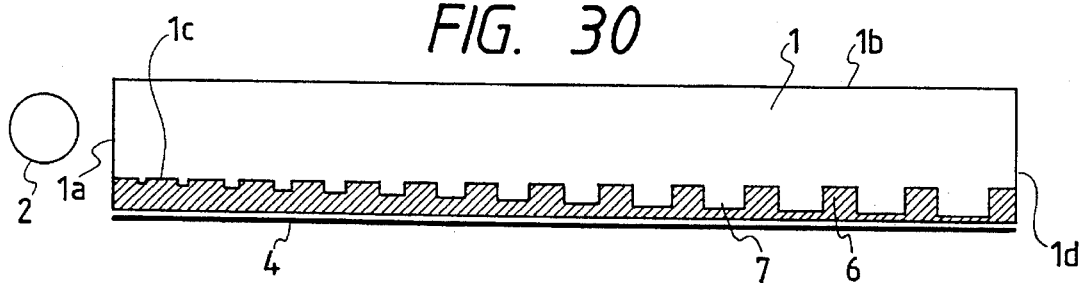

In the embodiment shown in FIG. 30, the cylindrical-shaped convex portions are formed on the opposite side surface 1c of the light conducting member 1; and the heights of the convex portions 7 are shorter on the light source 2 side and become higher as farther from the light source 2.

Figure 31:
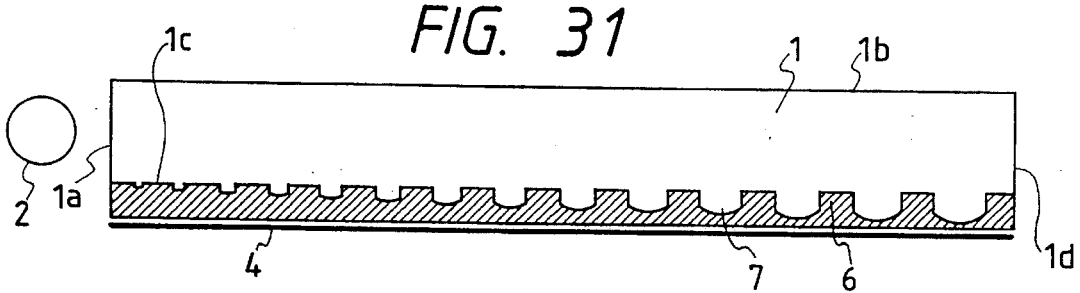
Figure 32:
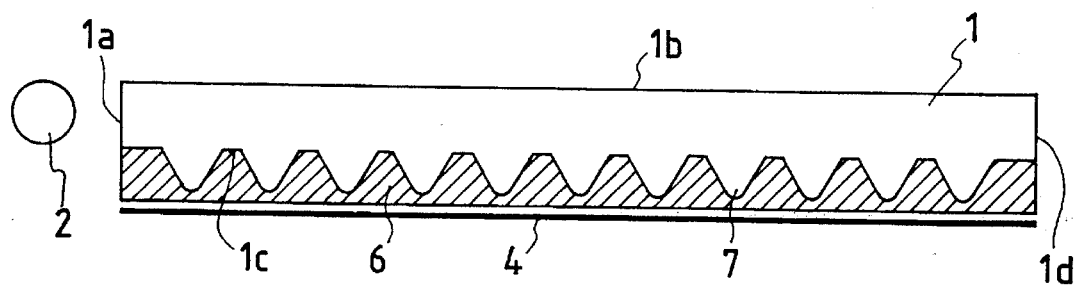
Figure 33:
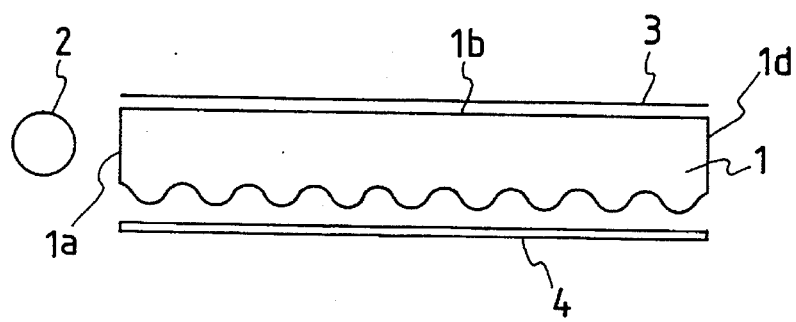
FIGS. 33 to 40 are schematic views representing examples of light conducting members to which the present invention can be applied.
Figure 34:
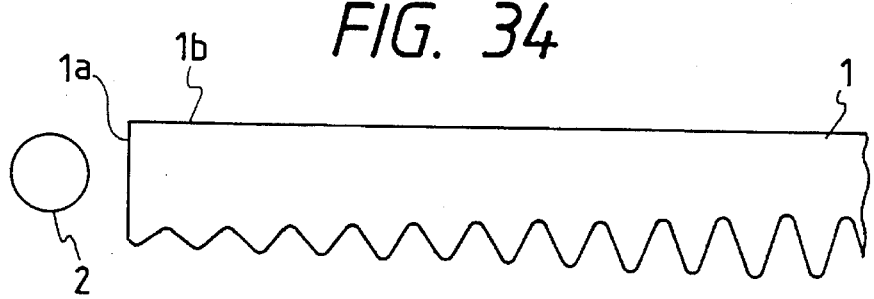
Figure 35:
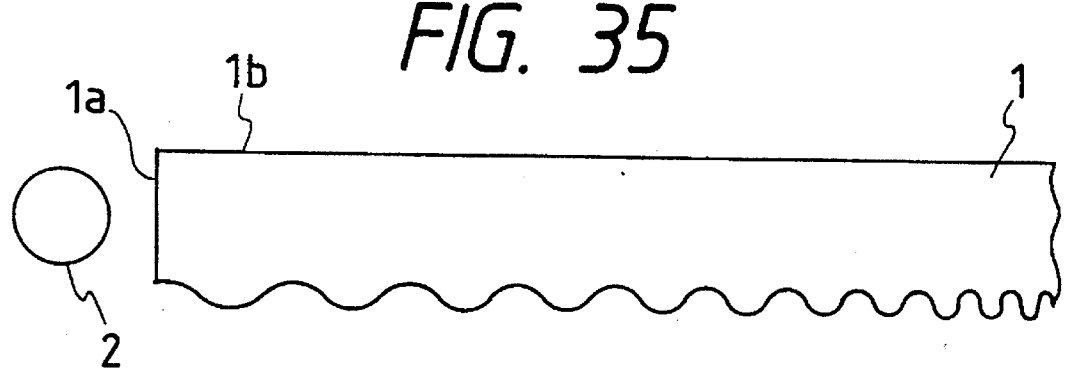
Figure 36:
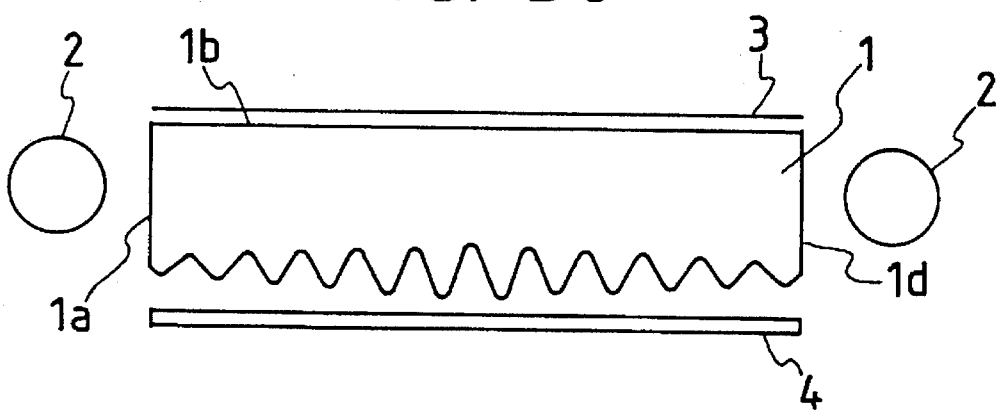
Figure 37:
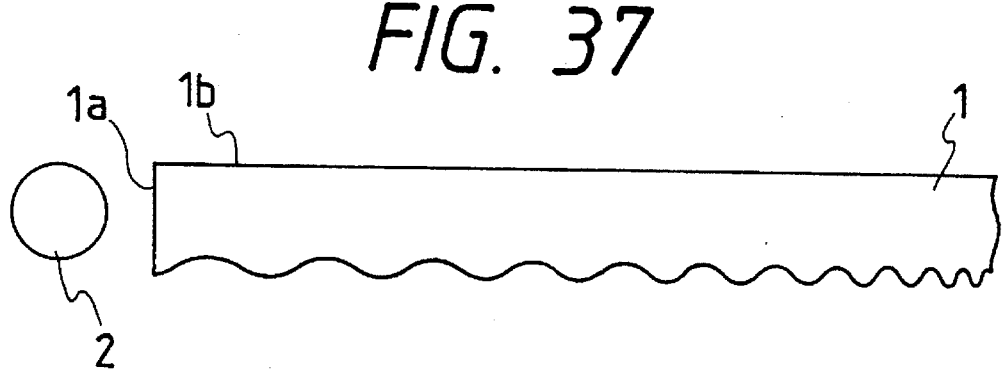
Figure 38:
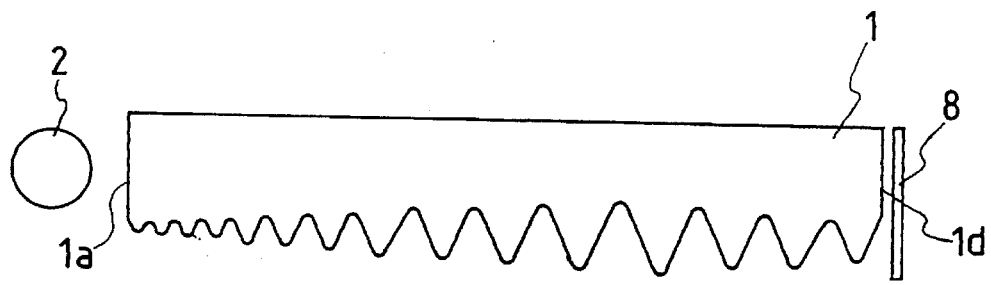
Figure 39:
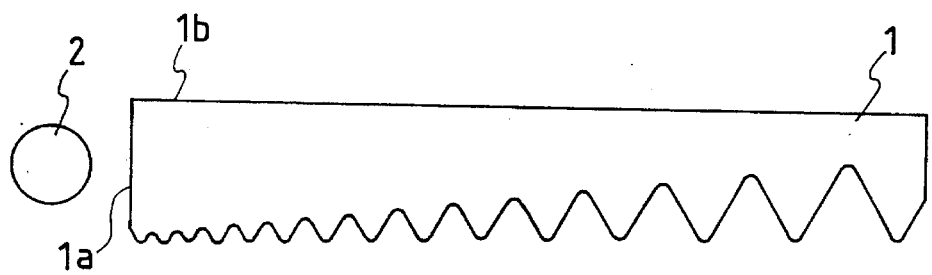
Figure 40:
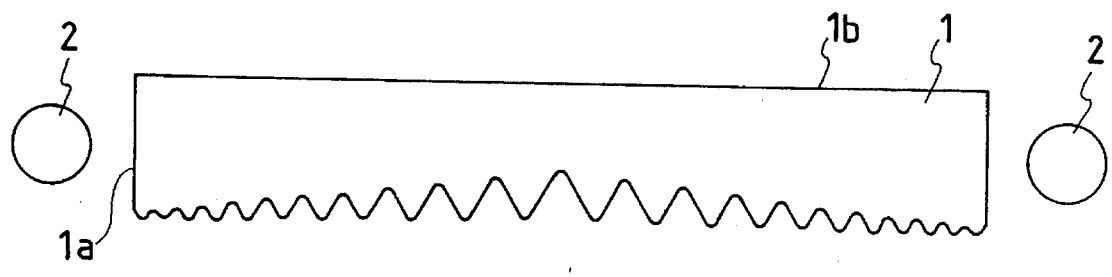

In the embodiment shown in FIG. 31, the convex portions 7 having almost the same shapes as those of the embodiment shown in FIG. 30, but the top surfaces 7a of the convex portions 7 are arranged to be round. And in the embodiment shown in FIG. 32, a multiplicity convex portions having the same shapes and the same dimensions are arranged on the opposite side surface 1c of the light conducting member 1 with the same pitch.

In each embodiment shown in FIGS. 28 to 32, the opposite side surface 1c of the light conducting member 1 is coated with the light diffusing material or the light scattering material 6 so as to cover all over the convex portions completely.

A reflective plate with a mirror surface or an aluminum sheet may be used as the reflective member 4 shown in FIGS. 2 to 31. Or, it may be possible to put an aluminum sheet on an inner surface of a container of the surface light source device and dispose the light conducting member above the sheet so that the opposite side surface 1c of the light conducting member 1 is to be adjacent to the aluminum sheet.

In FIGS. 32 to 39, are illustrated the other examples of the light conducting member, which are disclosed in U.S. Ser. No. 07/982942. The present invention can be applied to each light conducting member having a multiplicity of con cave portions on the opposite side surface thereof shown in these figures. That is to say, by fulfilling the light diffusing material or the light scattering material within the concave portions of the light conducting member or coating the light diffusing material or the light scattering material on the opposite side surface as a whole of the light conducting member, the light emitted from the light emitting surface 1b of the light conducting member becomes uniform.

In almost all of the above-explained embodiments, the dimensions or the pitches of the concave portions 5 or the convex portions 7 are varied as farther from the light source(s). Therefore, by such arrangement and the use of the light diffusing material or the light scattering material 6, the amount of the light emitted from the light emitting surface 1b of the light conducting member can be made almost uniform. However, in the embodiment shown in FIGS. 8, 9, 20, 21 and 32, the shapes, dimensions of the concave portions 5 or the convex portions 7 formed on the opposite side surface 1c of the light conducting member 1 are the same to each other, and these concave portions 5 or the convex portions 7 are arranged with a constant pitch. Therefore, if the ratio of the light scattering of the light diffused or dispersed by the light diffusing material or the light scattering material is uniform, it is difficult to make uniform the amount of the light emitted from the light emitting surface 1b of the light conducting member 1. That is to say, such surface light source device has its tendency that the emitting light becomes brighter as closer to the light source 2 and darker as farther from the light source 2. In order to prevent this problem, it is required to vary the ratio of the diffusion or scattering light so as to make it higher as farther from the light source and lower as closer to the light source.

What is claimed is:

1. A surface light source device comprising a light conducting member made of transparent material, a linear light source disposed in the vicinity of one of edge surfaces of said light conducting member, a diffusion plate disposed on a light emitting surface side of said light conducting member, and a reflective member disposed on an opposite side surface of said light emitting surface of said light conducting member, said light conducting member comprising a multiplicity of conical or polygonal pyramid-shaped concave portions formed on said opposite side surface of the light conducting member and said concave portions satisfy the following conditions:

$$80° \leq \alpha \leq 100°$$

$$90° > \beta > 90° - \theta$$

wherein the reference symbol $\alpha$ represents a top angle of the concave portion, $\beta$ represents an inclined angle of an inclined surface of the concave portion on a linear light source side, and $\theta$ is a value given by the following formula 1a when a refractive index of said light conducting member is represented by n:

$$\theta = sin^{-1}(1/n).$$

2. A surface light source device according to claim 1, wherein said opposite side surface of said light conducting member disposed on the reflecting member side is inclined such that a thickness of said light conducting member is the largest at the edge surface on the light source side and becomes smaller as farther from the light source.

3. A surface light source device according to claim 1, wherein said light conducting member is arranged as a plate-like member where a light emitting surface thereof and an opposite surface of the light emitting surface are arranged as plane surfaces being parallel to each other.

* * * * *